United States Patent
Chinnapatlolla et al.

(10) Patent No.: US 10,630,734 B2
(45) Date of Patent: Apr. 21, 2020

(54) MULTIPLEXED, MULTIMODAL CONFERENCING

(71) Applicant: International Business Machines Corporation, Armonk, NY (US)

(72) Inventors: Anjil R. Chinnapatlolla, Bangalore (IN); Casimer M. DeCusatis, Poughkeepsie, NY (US); Rajaram B. Krishnamurthy, Pleasant Valley, NY (US); Ajay Sood, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/055,924

(22) Filed: Aug. 6, 2018

(65) Prior Publication Data

US 2018/0352011 A1 Dec. 6, 2018

Related U.S. Application Data

(63) Continuation of application No. 15/062,287, filed on Mar. 7, 2016, now Pat. No. 10,069,877, which is a
(Continued)

(51) Int. Cl.
*H04L 29/06* (2006.01)
*H04L 29/08* (2006.01)
(Continued)

(52) U.S. Cl.
CPC ........ *H04L 65/1083* (2013.01); *G10L 15/265* (2013.01); *G10L 15/30* (2013.01);
(Continued)

(58) Field of Classification Search
CPC .................................................. H04L 65/1083
See application file for complete search history.

(56) References Cited

U.S. PATENT DOCUMENTS

| | | | |
|---|---|---|---|
| 4,953,159 A | 8/1990 | Hayden et al. | |
| 5,440,624 A | 8/1995 | Schoof | |
| 6,339,754 B1 * | 1/2002 | Flanagan | G06F 17/2827 704/2 |

(Continued)

OTHER PUBLICATIONS

Rev.com, "Closed Captions & Subtitles: Which Should You Use?", 2019 (Year: 2019).*
(Continued)

*Primary Examiner* — Ondrej C Vostal
(74) *Attorney, Agent, or Firm* — Daniel R. Simek

(57) ABSTRACT

A method for managing multiple electronic conference sessions. The method includes a computer processor identifying a plurality of conference sessions that a user is attending, wherein the plurality of conference sessions includes a first session and a second session. The method further includes a computer processor identifying one or more triggers that indicate an occurrence of an event in at least one of the plurality of conference sessions. The method further includes a computer processor determining that the user is an active participant in at least the first session of the plurality of conference sessions that the user is attending. The method further includes a computer processor detecting at least one trigger of the one or more identified triggers, within the second session of the plurality of conference sessions that the user is attending.

14 Claims, 4 Drawing Sheets

Related U.S. Application Data continuation of application No. 14/864,965, filed on Sep. 25, 2015, now Pat. No. 10,075,482.

(51) Int. Cl.
    *G10L 15/26*             (2006.01)
    *G10L 15/30*             (2013.01)
    *H04L 12/58*             (2006.01)
    *H04L 12/18*             (2006.01)

(52) U.S. Cl.
    CPC ........ *H04L 12/1822* (2013.01); *H04L 51/043* (2013.01); *H04L 65/1089* (2013.01); *H04L 65/1096* (2013.01); *H04L 65/403* (2013.01); *H04L 65/4015* (2013.01); *H04L 67/16* (2013.01); *H04L 67/26* (2013.01); *G10L 15/26* (2013.01)

(56) References Cited

U.S. PATENT DOCUMENTS

| | | |
|---|---|---|
| 7,417,989 B1 | 8/2008 | Doran |
| 7,467,185 B2 | 12/2008 | Lapstun et al. |
| 7,533,146 B1 | 5/2009 | Kumar |
| 7,627,479 B2 | 12/2009 | Travieso et al. |
| 7,644,127 B2 | 1/2010 | Yu |
| 7,653,192 B1 | 1/2010 | Sylvain |
| 8,050,906 B1 | 1/2011 | Zimmerman et al. |
| 7,885,396 B2 | 2/2011 | Liang et al. |
| 8,060,565 B1 | 11/2011 | Swartz |
| 8,065,294 B2 | 11/2011 | Travieso et al. |
| 8,200,756 B2 | 6/2012 | Kamiely |
| 8,204,195 B2 | 6/2012 | Geppert et al. |
| 8,325,883 B2 * | 12/2012 | Schultz ............. H04M 3/42391 370/466 |
| 8,370,433 B2 | 2/2013 | Conner et al. |
| 8,433,718 B2 | 4/2013 | Travieso et al. |
| 8,442,197 B1 | 5/2013 | Mazza et al. |
| 8,495,003 B2 | 7/2013 | Nista et al. |
| 8,566,710 B2 | 10/2013 | Travieso et al. |
| 8,631,069 B2 | 1/2014 | Maes |
| 8,812,527 B2 * | 8/2014 | Cleaver ................ G06Q 10/101 705/14.49 |
| 9,013,538 B2 | 4/2015 | Ellison et al. |
| 9,043,474 B2 * | 5/2015 | Schleifer ............. H04L 12/1818 709/227 |
| 9,484,003 B2 | 11/2016 | VanBlon et al. |
| 9,619,464 B2 | 4/2017 | Gusakov et al. |
| 9,716,861 B1 | 7/2017 | Poel et al. |
| 9,800,931 B1 | 10/2017 | Tangeland et al. |
| 9,864,809 B2 | 1/2018 | Travieso et al. |
| 9,870,796 B2 * | 1/2018 | Goldberg ............... G06Q 10/10 |
| 2002/0184376 A1 | 2/2002 | Sternagle |
| 2002/0198941 A1 | 12/2002 | Gavrilescu et al. |
| 2003/0013438 A1 * | 1/2003 | Darby .................... G06Q 30/02 455/419 |
| 2003/0046344 A1 | 3/2003 | Kumhyr et al. |
| 2003/0105820 A1 | 6/2003 | Haims et al. |
| 2003/0106019 A1 | 6/2003 | Silverbrook et al. |
| 2003/0236827 A1 | 12/2003 | Patel et al. |
| 2004/0004942 A1 | 1/2004 | Nebiker et al. |
| 2005/0021322 A1 | 1/2005 | Richardson et al. |
| 2005/0034079 A1 | 2/2005 | Gunasekar et al. |
| 2005/0180341 A1 | 8/2005 | Nelson et al. |
| 2006/0067250 A1 * | 3/2006 | Boyer ................. H04L 12/1818 370/260 |
| 2006/0085417 A1 | 4/2006 | John et al. |
| 2006/0101143 A1 | 5/2006 | Garcia et al. |
| 2006/0149558 A1 * | 7/2006 | Kahn .................... G10L 15/063 704/278 |
| 2007/0050191 A1 | 3/2007 | Weider et al. |
| 2007/0071206 A1 * | 3/2007 | Gainsboro .......... H04M 3/2281 379/168 |
| 2007/0115899 A1 | 5/2007 | Ovadia et al. |
| 2007/0143103 A1 * | 6/2007 | Asthana ................ H04M 3/567 704/200 |
| 2007/0156908 A1 | 7/2007 | Szomolanyi et al. |
| 2007/0244969 A1 * | 10/2007 | Knight .................... G06Q 10/10 709/204 |
| 2007/0282951 A1 | 12/2007 | Selimis |
| 2008/0068447 A1 | 3/2008 | Mattila |
| 2008/0072221 A1 | 3/2008 | Chkodrov et al. |
| 2008/0276159 A1 * | 11/2008 | Narayanaswami ... G06F 17/241 715/202 |
| 2009/0013045 A1 | 1/2009 | Maes et al. |
| 2009/0033737 A1 | 2/2009 | Goose et al. |
| 2009/0037534 A1 | 2/2009 | Castro et al. |
| 2009/0081999 A1 | 3/2009 | Khasawneh et al. |
| 2009/0129296 A1 | 5/2009 | Grinshpun et al. |
| 2009/0157469 A1 | 6/2009 | D'Urso et al. |
| 2009/0164580 A1 | 6/2009 | Schultz et al. |
| 2009/0172101 A1 | 7/2009 | Arthursson |
| 2009/0193345 A1 | 7/2009 | Wensley et al. |
| 2009/0204906 A1 | 8/2009 | Irving |
| 2010/0036929 A1 * | 2/2010 | Scherpa ................. G06Q 10/10 709/207 |
| 2010/0042647 A1 * | 2/2010 | Schultz ............... H04L 12/1831 379/85 |
| 2010/0250497 A1 | 9/2010 | Redlich et al. |
| 2011/0249079 A1 | 10/2011 | Santamaria et al. |
| 2011/0271192 A1 | 11/2011 | Jones et al. |
| 2011/0289401 A1 | 11/2011 | Fischer |
| 2012/0042026 A1 | 2/2012 | Park et al. |
| 2012/0128322 A1 | 5/2012 | Shaffer et al. |
| 2012/0140020 A1 | 6/2012 | Rosenberg et al. |
| 2012/0166546 A1 * | 6/2012 | Venon ................... G06F 19/321 709/205 |
| 2012/0166562 A1 | 6/2012 | Lu et al. |
| 2012/0233273 A1 | 9/2012 | Miner et al. |
| 2012/0278263 A1 | 11/2012 | Borthwick et al. |
| 2013/0010049 A1 | 1/2013 | Mostafa et al. |
| 2013/0058471 A1 * | 3/2013 | Garcia .............. H04M 3/42221 379/202.01 |
| 2013/0066623 A1 * | 3/2013 | Chou .................... G06F 17/289 704/2 |
| 2013/0066978 A1 | 3/2013 | Bentley et al. |
| 2013/0159432 A1 * | 6/2013 | Deering ................ G06Q 10/107 709/206 |
| 2013/0342637 A1 | 12/2013 | Felkai et al. |
| 2014/0003450 A1 | 1/2014 | Bentley et al. |
| 2014/0028778 A1 | 1/2014 | Shapiro et al. |
| 2014/0029919 A1 | 1/2014 | Codavalli et al. |
| 2014/0126710 A1 | 5/2014 | Boss et al. |
| 2014/0228011 A1 * | 8/2014 | Goel ....................... H04W 4/06 455/416 |
| 2014/0304505 A1 | 10/2014 | Dawson |
| 2014/0359709 A1 | 12/2014 | Nassar et al. |
| 2015/0149540 A1 * | 5/2015 | Barker ................ H04L 12/1827 709/204 |
| 2015/0169069 A1 * | 6/2015 | Lo ........................... G06F 3/017 715/753 |
| 2015/0281433 A1 * | 10/2015 | Gainsboro .......... H04M 3/2281 379/88.01 |
| 2015/0304121 A1 | 10/2015 | Wu et al. |
| 2016/0036873 A1 | 2/2016 | Tonn et al. |
| 2016/0306504 A1 * | 10/2016 | Brunsch ................. H04L 51/04 |
| 2016/0337213 A1 * | 11/2016 | Deutsch ................ H04L 43/045 |
| 2017/0078490 A1 * | 3/2017 | Kaminsky .............. H04M 11/06 |
| 2017/0093590 A1 | 3/2017 | Chinnapatlolla |
| 2017/0237788 A1 | 8/2017 | Xi et al. |
| 2017/0249853 A1 | 8/2017 | Weiss |
| 2018/0049023 A1 | 2/2018 | Stuber |
| 2018/0091648 A1 | 3/2018 | Hughes |
| 2018/0198831 A1 | 7/2018 | Calcaterra |
| 2018/0284957 A1 | 10/2018 | Afsari et al. |

OTHER PUBLICATIONS

Wikipedia, "Closed captioning", 2019 (Year: 2019).*
List of IBM Patents or Patent Applications Treated as Related, Appendix P, Filed Mar. 7, 2016, 2 pages.

(56) References Cited

OTHER PUBLICATIONS

Anjil R. Chinnapatiolla, et al., "Multiplexed, Multimodal Conferencing", U.S. Appl. No. 14/864,965, filed Nov. 25, 2015, (a copy is not provided as this application is available to the Examiner).
Anjil R. Chinnapatiolla, et al., "Multiplexed, Multimodal Conferencing", U.S. Appl. No. 15/062,287, filed Mar. 7, 2016, (a copy is not provided as this application is available to the Examiner).
Merriam-Webster, "fuzzy logic", 2018.
Merriam-Webster, "confidence interval", 2018.
Wikipedia, "Fuzzy logic", 2018.
Wikipedia, "Confidence interval", 2018.
Kolonin, "Automatic text classification and property extraction", 2015.
Martins et al., "The WebCAT Framework Automatic Generation of Meta-Data for Web Resources", 2005.
MotionPoint, "Industry-Leading Technology", 2003-2018.
Rosenberg et al., "SIP: Session Initiation Protocol", RFC3261, 2002.
U.S. Appl. No. 16/057,412, filed Aug. 7, 2018.

\* cited by examiner

MULTIPLEXED, MULTIMODAL CONFERENCING

BACKGROUND OF THE INVENTION

The present invention relates generally to the field of telecommunication, and more particularly to teleconferencing.

A telephone or audio conference (i.e., teleconference) enables multiple participants to communicate with the other participants of the teleconference, or optionally, mute a connection and attend the teleconference in "listen only" mode. Video conferences (e.g., video telephony) add visual elements to a conference session. Some technologies utilize computer systems to communicate the visual elements (e.g., charts, graphs, videos, pictures, etc.) and other digital elements (e.g., digital audio files, animated graphics, etc.), while standard telephony communicates the verbal (e.g., audio) portion of the conference session.

Businesses can utilize teleconferences to communicate directly with multiple individual (e.g., of the business, of a supplier, of a client, etc.) dispersed across various geographical location without incurring the time, the expense, and the disruption associated with travel for in-person interactions. Mobile collaboration systems combine the use of video, audio, and on-screen drawing capabilities using various hand-held electronic devices to broadcast over secure networks, enabling multi-party conferencing in real-time, independent of location. With the advent of Cloud computing systems and services, digital teleconferencing provides a more secure mobile collaboration system where user may exchange data, files, images, videos, and in some instances, collaboration software can allow participants in different locations to interact with the data, files, images, and videos (e.g., project management, online proofing, etc.).

Teleconferencing is not limited to a business environment. Education and medicine also benefit from teleconferencing. For example, educational institutions offer on-line classes that allow students to obtain degrees. In some cases, a student utilizes the Internet to participate in a real-time classroom lecture that may include an instant messaging (IM) function or audio function to ask questions. In other cases, classes and lectures may be prerecorded and a student accesses the information in an on-demand mode over the Internet.

SUMMARY

According to aspects of the present invention, there is a method, computer program product, and/or system for managing multiple electronic conference sessions. The method includes one or more computer processors identifying a plurality of conference sessions that a user is attending, wherein the plurality of conference sessions includes a first session and a second session. The method further includes one or more computer processors identifying one or more triggers that indicate an occurrence of an event in at least one of the plurality of conference sessions. The method further includes one or more computer processors determining that the user is an active participant in at least the first session of the plurality of conference sessions that the user is attending. The method further includes one or more computer processors detecting at least one trigger of the one or more identified triggers, within the second session of the plurality of conference sessions that the user is attending.

DETAILED DESCRIPTION

Figure 1:
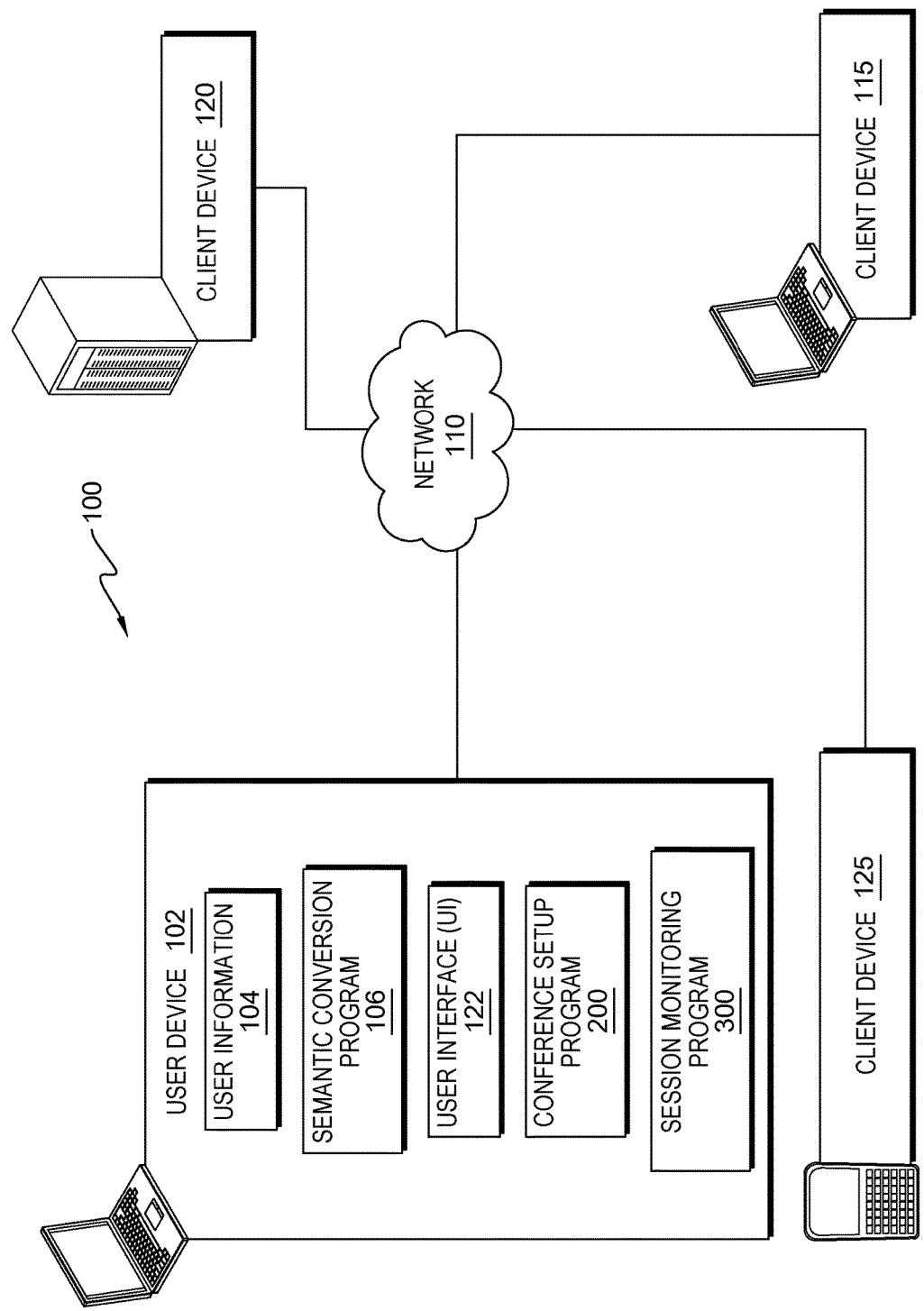
FIG. 1 illustrates a distributed computing environment, in accordance with an embodiment of the present invention.

Embodiments of the present invention recognize that a user may need the capability to attend multiple audio conferences, video conferences, and collaboration events, herein identified as sessions, at the same time. However, embodiments of the present invention also recognize that a user may need to isolate one session from another session. For example, a user may isolate sessions to maintain focus, minimize cross-talk between session that can be disruptive to other participants, and maintain security (e.g., avoid unauthorized sharing of information). Some embodiments of the present invention may utilize a mobile device such as a smartphone. Other embodiments of the present invention utilize voice over Internet protocol (VoIP) to communicate via a computing device (e.g., desktop computer). In another embodiment of the present invention, the capabilities of a computing device and a digital telephony system may be integrated to enable a user to attend and monitor multiple sessions.

Embodiments of the present invention may be utilized in a plurality of environments and functions. For example, attending and monitoring multiple sessions may be utilized by: businesses, students, educators, researchers, government agencies, medical professionals, hospitals and the like. Embodiments of the present invention obtain information that is relevant to a user, an organization, a project, etc. and utilizes the obtained information as the basis for triggers that can be detected within one or more sessions. Embodiments of the present invention may utilize a variety of semantic conversion programs to provide streaming text transcripts of the proceeding of each session. In addition, an embodiment of the present invention may determine information related to each user attending a session (e.g., a name, an organization, a status or mode, such as participating, muted, off-line, auditing, monitoring, and observing) and include the related information within the streaming transcript. In some embodiments of the present invention, the information provided within streaming text transcript may vary by user and the device of the user. In an example, if a user is utilizing an electronic device that constrains the user to audio and text, the streaming text transcript may include descriptions of visual elements of the presentation such as gestures of a presenter.

In addition, embodiments of the present invention monitor the real-time transcripts of each session, scanning (e.g., detecting) for the presence of one or more triggers. Embodiments of the present invention provide a user an indication as to which session includes the detected triggers and provides the user a method to automatically modify the connection and/or user mode of a session when another session is selected. In another embodiment, the present invention may provide a user an option to save a streaming transcript of a session. Some embodiments of the present invention enable a user may have two or more active sessions. Other embodiments of the present invention enable a user may link two or more sessions.

In addition, embodiments of the present invention may utilize other software to determine additional information corresponding to the content (e.g., verbal, text, graphical, physical) presented during a session that is included in the streaming transcript. For example, embodiments of the present invention may utilize: cognitive analysis, contextual analysis, and analytics to determine the additional information corresponding to the content within a monitored session. Similarly, embodiments of the present invention may utilize: cognitive analysis, contextual analysis, and analytics to further analyze: gestures, comments, graphics, sounds, video, etc., to determine related information (e.g., citations, regulations, definitions, etc.). The related information may be accessed via an universal resource locator (URL) that is embedded (e.g., hyperlinked) in the streaming transcript. Some embodiments of the present invention may utilize cognitive analysis, contextual analysis, analytics, and other databases to determine the additional trigger that are associated with a user. Example embodiments of the present invention may accesses a company database to determine the names of peers and reporting structure of a user and include the determined names as additional triggers to detect within a streaming transcript.

Further embodiments of the present invention may utilize semantic conversion, cognitive analysis, contextual analysis, and analytics software that analyze information from prerecorded sessions and/or information feeds (e.g., on-demand lectures, new stories, digital transcripts), to provide a user access to information (e.g., to sort, to locate, to display, etc.) within the linked content of a streaming text transcript. Some embodiments of the present invention, the may utilize analytical software that can process information at an increased throughput (e.g., fast-forward). In other embodiments of the present invention, a recording of a conference session (e.g., presentation, proceedings, etc.) and a corresponding streaming text transcript are saved to a conferencing database for future access.

The descriptions of the various scenarios, instances, and examples related to the present invention have been presented for purposes of illustration but are not intended to be exhaustive or limited to the embodiments disclosed.

The present invention will now be described in detail with reference to the Figures. FIG. 1 is a functional block diagram illustrating distributed computing environment 100 in an embodiment, in accordance with the present invention. An embodiment of distributed computing environment 100 may include: user device 102, client device 115, client device 120, and client device 125, all interconnected over network 110. Many modifications to the depicted environment may be made by those skilled in the art without departing from the scope of the invention as recited by the claims.

User device 102, client device 115, client device 120, and client device 125 may be laptop computers, tablet computers, netbook computers, personal computers (PC), desktop computers, personal digital assistants (PDA), smart phones, wearable devices (e.g., digital eyeglasses, smart glasses, a smart watch), or any programmable computer systems known in the art. In certain embodiments, user device 102, client device 115, client device 120, and client device 125 represent computer systems utilizing clustered computers and components (e.g., database server computers, application server computers, etc.) that act as a single pool of seamless resources when accessed through network 110, as is common in data centers and with cloud-computing applications. In general, user device 102, client device 115, client device 120, and client device 125 are representative of any programmable electronic device or combination of programmable electronic devices capable of executing machine readable program instructions and communicating with users of user device 102, client device 115, client device 120, and client device 125, via network 110. User device 102, client device 115, client device 120, and client device 125 may include components, as depicted and described in further detail with respect to FIG. 4, in accordance with embodiments of the present invention.

User device 102 includes user information 104, semantic conversion program 106, user interface (UI) 122, conference setup program 200, session monitoring program 300, and various programs and databases (e.g., a website interface, presentation software, telephony software, voice over Internet protocol (VoIP) software, conferencing software, a calendar program, audio/video playback software, etc.) (not shown). In some embodiments, user device 102 may include additional programs that provide cognitive, analytic, and contextual analysis capabilities to semantic conversion program 106. In other embodiments, user device 102 may utilize additional programs that provide cognitive, analytic, and contextual analysis capabilities to semantic conversion program 106 on a computing system accessed via network 110.

In one embodiment, user information 104 contains user information, user preferences, predefined triggers, predefined responses, conference system setups, controls (e.g., phone numbers, access codes, hot-key combinations, etc.), and other information utilized by conference setup program 200. For example, a user preference may predefine how user device 102 responds to a haptic event (e.g., vibrating) to identify which session includes the occurrence of a trigger. In a scenario, user information 104 includes user preferences that may dictate which capabilities of semantic conversion program 106 are utilized for each session. In an example, user information 104 may dictate that semantic conversion program 106 annotates a text transcript with a name corresponding to a participant of a portion of the transcript.

In another embodiment, user information 104 includes information (e.g., triggers) that session monitoring program 300 utilizes to detect occurrences of information within the output of semantic conversion program 106. In one scenario, user information 104 includes information and/or triggers that are generalized and may be identified within one or more sessions. In an additional example, user information 104 may include organizational information (e.g., names, departments, reporting structures, calendar entries, etc.) associated with a user of user device 102. In another scenario, user information 104 may include information and/or triggers that are defined for a session (e.g., primary triggers). In an example, user information 104 includes the triggers: proposal #309432A2, CAD drawings, and government regulations, which are defined for a session that utilizes access code 153401*. In another scenario, user information 104 may include one or more confidence intervals utilized to determine the detection of a trigger or other analysis of a session (e.g., fuzzy triggers). In some embodiments, user information 104 includes additional details related to the user of user device 102 that may be utilized to generate contextual triggers (e.g., secondary). In an example, the additional details of a user information may include, but not limited to: areas of expertise, skills, social-media information, educational background, certifications, and professional networking contacts.

In one embodiment, semantic conversion program 106 may be a speech-to-text conversion program that provides a streaming transcript (e.g., text) of a session to a user of user device 102. In some embodiments, semantic conversion program 106 includes identifiers (e.g., annotation, participation mode, etc.) for one or more users attending a conference session within a streaming transcript. In another embodiment, semantic conversion program 106 includes image and gesture recognition. In a further embodiment, semantic conversion program 106 may be comprised of a suite of programs that includes: semantic, cognitive, analytical, contextual analysis, image processing, gesture recognition, database search capabilities and the like. In some scenarios, semantic conversion program 106 may utilize fuzzy logic and confidence intervals identified within user information 104 when analyzing a session. In one example, semantic conversion program 106 follows a gesture by a presenter, within a conference session, to the indicated portion of the screen and semantic conversion program 106 further analyzes the indicated portion of the screen and includes a description of the analysis in the text transcript. In another example, semantic conversion program 106 accesses various Intranet and Internet databases to obtain information and/or information links that can be associated elements of a session that are indicated in a streaming transcript. In some embodiments, semantic conversion program 106 utilizes a plurality programs and devices, accessible via network 110, to enable conference setup program 200 and/or session monitoring program 300.

In another embodiment, semantic conversion program 106 may include multi-lingual conversion capabilities. Semantic conversion program 106 may augment a transcript of a session with additional information (e.g., citations, regulations, definitions, news articles, etc.) and/or controls to access the additional information. The additional information may include various indicators, such as highlights, colored hyperlinks, speaker names, file links, graphical control elements, etc., within a real-time transcript of a session as opposed to describing non-verbal portions (e.g., charts, graphs, pictures, etc.) of a session. For example, highlighted information within a session transcript may generate a temporary overlay that includes additional details when a user of user device 102 hovers the mouse pointer (e.g., mouse-over) over the highlighted text. In some embodiments, semantic conversion program 106 interfaces (e.g., synchronizes) with a recording function of the conferencing software. In an example, scrolling through a text transcript created by semantic conversion program 106 may move (e.g., rewind, fast-forward) a recorded portion of a session to match the text selected by a user.

In an alternative embodiment, semantic conversion program 106 exists on network 110 as a service by a provider of the conferencing system. In a scenario, semantic conversion program 106 streams information to each user attending a teleconference or video conference. In some scenarios, semantic conversion program 106 may interface with one or more support programs (e.g., an image processing program, a gesture recognition program, cognitive analysis program, a contextual analysis program, an analytical program, a database search program, etc.) on user device 102. In other scenarios, semantic conversion program 106 interfaces with one or more support program accessible via network 110. In other scenarios, the transcripts (e.g., streaming text) of a session are limited to the users of the conferencing system that subscribe to semantic conversion program 106 of the conference system provider.

In one embodiment, user device 102, client device 115, client device 120, and client device 125 communicate through network 110. Network 110 can be, for example, a local area network (LAN), a telecommunications network, a wireless local area network (WLAN), such as an intranet, a wide area network (WAN), such as the Internet, or any combination of the previous and can include wired, wireless, or fiber optic connections. In general, network 110 can be any combination of connections and protocols that will support communications between user device 102, client device 115, client device 120, and client device 125, in accordance with embodiments of the present invention. In another embodiment, network 110 operates locally via wired, wireless, or optical connections and can be any combination of connections and protocols (e.g., near field communication (NFC), laser, infrared, etc.).

UI 122 accepts input from a plurality of input/output (I/O) devices (not shown) including, but not limited to, a tactile sensor interface (e.g., a touch screen, a touchpad) or a natural user interface (e.g., voice control unit, motion capture device, eye tracking, cyberglove, head-up display etc.). In addition to the audio and visual interactions that user device 102 may include, a peripheral, such as a cyberglove that may provide haptic feedback (e.g., vibrations) to a user. An I/O device interfacing with a UI 122 may be connected to a user device 102 which may operate utilizing wired (e.g., USB port) or wireless network communications (e.g., infrared, NFC, etc.). For example, an I/O device may be a peripheral, such as a keyboard, a mouse, a trackball, and a click wheel that provides input from a user. A user may utilize UI 122 to interact with conference setup program 200 and session monitoring program 300.

In some embodiments, UI 122 may automatically reconfigure based on the type of conference sessions that user device 102 accesses. In other embodiments, UI 122 may automatically reconfigure based on one or more constraints. In an example, user device 102 is bandwidth constrained and cannot present audio, video, and text together. UI 122 may utilize a user preference to reconfigure to text and audio only. Subsequently, session monitoring program 300 detects the modifications the presentation of the conferences by UI 122 and session monitoring program 300 adjust one or more flags presented to a user of user device 102 when a trigger is activated. In other embodiments, UI 122 includes the windows or other graphical control elements that may display a presentation of a session and a respective window for the streaming text transcript for a session. In some scenarios, UI 122 responds to the occurrence of a trigger based on a user preference. In an example, UI 122 increases the size of the window for a session that includes an occurrence of a trigger and positions the window in proximity to a window that includes a session where the user is a participant.

Conference setup program 200 enables a user of user device 102 to connect to a plurality of conference sessions. Conference setup program 200 monitors the presentations (e.g., proceedings) of each conference utilizing semantic conversion program 106 to generate streaming text transcripts of the monitored sessions. Conference setup program 200 may execute multiple instances of semantic conversion program 106. In some embodiments, conference setup program 200 utilizes an instance of semantic conversion program 106 that includes: cognitive analysis, contextual analysis, and/or analytics capabilities. In addition, conference setup program 200 interfaces with session monitoring program 300 to detect information within a monitored session that may activate one or more triggers within user information 104 and provide an indication (e.g., audio, visual, haptic) to the user of user device 102 when a trigger is activated within a monitored session. Conference setup program 200 may execute at the same time as session monitoring program 300.

In other embodiments, one or more sessions may be prerecorded audio and/or visual content as opposed to real-time sessions (e.g., events), which are obtained as inputs from a user. In other embodiments, one or more sessions may be prerecorded audio and/or visual content as opposed to real-time sessions (e.g., events), which are embedded within content of a conferencing session. For example, conference setup program 200 may access a training video, news clip, on-demand education lecture, etc. In a further embodiment, conference setup program 200 may utilize an audio/video playback program that is capable of variable speed (e.g., fast-forward) playback of prerecorded content. Conference setup program 200 may utilize an instance of semantic conversion program 106 that is capable of analyzing the audio/video content at an accelerated playback rate.

In an embodiment, session monitoring program 300 utilizes information provided by conference setup program 200 and semantic conversion program 106 to monitor multiple sessions and provide the user of user device 102 an indication when a trigger is detected in a session. In addition, session monitoring program 300 may modify the conference session connections when a user of user device 102 indicates that the user changes the conference session in which the user participates and which the user monitors. In a further embodiment, session monitoring program 300 may enable a user of user device 102 to interface with more than one sessions. In some embodiments, session monitoring program 300 provides a utility for a user to link (e.g., three-way call) two sessions that the user of user device 102 attends (e.g., monitors, participates). In other embodiments, session monitoring program 300 provides a utility to access content (e.g., session content, pre-recorded content, etc.) without modifying one or more conference session connections.

Figure 2:
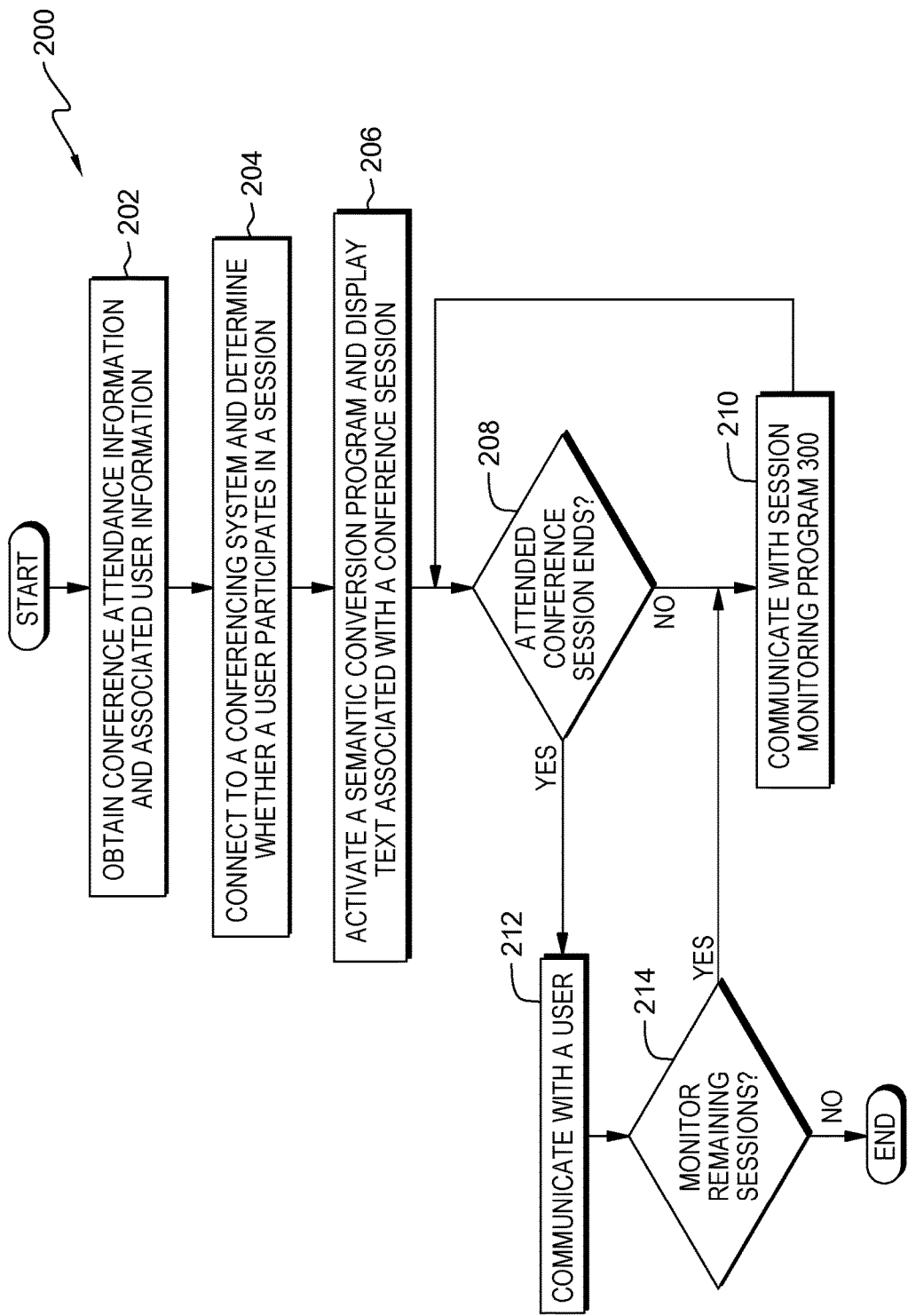
FIG. 2 depicts a flowchart of the operational steps of a conference setup program, in accordance with an embodiment of the present invention.

FIG. 2 is a flowchart depicting operational steps for conference setup program 200, a program for connecting a user to a plurality of conference sessions and interfacing with session monitoring program 300, in accordance with embodiments of the present invention. In addition, conference setup program 200 may utilize one or more instances of semantic conversion program 106 to display streaming text corresponding to the presentation of respective sessions.

In step 202, conference setup program 200 obtains conference attendance information and associated user information. In one embodiment, conference setup program 200 obtains conference attendance information for a session from user information 104. In an example, conference attendance information obtained by conference setup program 200 may include: session login information, encryption protocol, conference session command codes (e.g., mute, transfer, raise hand, etc.), attendees, keywords, user defined triggers, contextual based triggers, and other contextual information. In another embodiment, conference setup program 200 obtains user information from user information 104, which may be provided to a session. In an example, conference setup program 200 may provide a first conference session a name of a user, a company of a user, a title of a user, an e-mail for a user, and a location of a user. Whereas, conference setup program 200 may restrict the user information provided to a second session to the name of a user.

In some embodiments, conference setup program 200 obtains additional information for a user from user information 104 such as: areas of expertise, skills, social-media information, educational background, certifications, and professional networking contacts. In one scenario, conference setup program 200 may include additional information of a user as participant information for a session, such as information accessible by other participants of the session. In another scenario, conference setup program 200 may provide additional associated with a user to semantic conversion program 106. In some scenarios, conference setup program 200 may provide additional information for a user to both a session and semantic conversion program 106.

Referring to step 202 in other embodiments, conference setup program 200 determines the capabilities of user device 102. In one scenario, conference setup program 200 determines whether user device 102 includes an instance of semantic conversion program 106 and the capabilities of the instance of semantic conversion program 106. In an example, conference setup program 200 determines whether semantic conversion program 106 includes: cognitive analysis, contextual analysis, and/or analytics capabilities. In another scenario, conference setup program 200 determines the user interface capabilities associated with user device 102. In an example, conference setup program 200 may determine: a screen size (e.g., dual monitors, smart phone screen, etc.) of user device 102, an user interface for user device 102 (e.g., keyboard and mouse, touch screen, voice activated, etc.), and a connection speed for user device 102 (e.g., 10 GB/second Ethernet, 2 MB/second wireless, etc.).

In step 204, conference setup program 200 connects to a conferencing system and determines whether a user participates in a session. In one embodiment, conference setup program 200 monitors user device 102 to determine when a user attends (e.g., logs into) a session. In another embodiment, conference setup program 200 accesses a calendar of a user and identifies one or more sessions within a window of time. Conference setup program 200 obtains information (e.g., login information) related to accessing the one or more identified sessions from the calendar of a user. Subsequently, conference setup program 200 establishes a connection to the one or identified sessions within a calendar of a user. In addition, conference setup program 200 determines which one or more sessions that a user is an active participant as opposed to a passive observer (e.g., through monitoring of the user, by analyzing conference session connection parameters). In one embodiment, conference setup program 200 determines whether a user participates in a session based on the conference session command codes input by a user for a session. In another embodiment, conference setup program 200 determine whether a user participates in a session based on information associated with a graphic control element (e.g., GUI, window, etc.) of a session. In an example, conference setup program 200 may determine that a user participates in a session that executes (e.g., displays) within a maximized window and that the user observers (e.g., monitors) one or more session that execute within a minimized window. In some embodiments, conference setup program 200 may activate a record function within the conferencing software utilized by conference setup program 200.

In step 206, conference setup program 200 activates a semantic conversion program and displays text associated with a session. In an embodiment, conference setup program 200 indicates that semantic conversion program 106 generates a real-time, streaming text transcript of a presentation for a session. In some embodiments, conference setup program 200 activates an instance of semantic conversion program 106 for each session attended by a user. In one embodiment, conference setup program 200 activates an instance of semantic conversion program 106 that monitors a session and semantic conversion program 106 generates a streaming text transcript of the presentation within the session. In another embodiment, conference setup program 200 utilizes user preferences within user information 104 to determine which capabilities (e.g., cognitive, analytical, contextual, language translation, annotation, highlighting, hot-spots, etc.) of semantic conversion program 106 are utilized to generate a text transcript of a session.

In another embodiment, conference setup program 200 generates a window for each text transcript generated by semantic conversion program 106. In one scenario, conference setup program 200 generates another window for each session that includes a session window and the respective window displaying a text transcript (e.g., places the two windows in proximity) of the session generated by semantic conversion program 106. In another embodiment, conference setup program 200 links a session window to a window that displays the respective text transcript generated by semantic conversion program 106 for the session (e.g., places the two windows in proximity). In some embodiments, conference setup program 200 hides a window associated with a session that the user is a participant. In other embodiments, conference setup program 200 enables a user to size and position a window containing a text transcript that is associated with a session independently of the size and status of session window.

In decision step 208, conference setup program 200 determines whether an attended conference session ends. In one embodiment, conference setup program 200 determines that an attended session ends when a window associated with a session is closed. In another embodiment, conference setup program 200 determines that a session ends when session setup program detects that a user initiates a command code (e.g., close, logout, etc.) that terminates a session connection. In some embodiments, conference setup program 200 determines that a session ends when an external command or message (e.g., host disconnected from network, end of session, etc.) is issued. In an example, a user of client device 120 hosts a presentation (e.g., hosts a session). Conference setup program 200 determines that the presentation is over when client device 120 disconnects from network 110. In another example, conference setup program 200 detects an "end of presentation" message in a text transcript for a session generated by semantic conversion program 106.

In decision step 208, responsive to determining that an attended session did not end (No branch, decision step 208), conference setup program 200 communicates with session monitoring program 300 (step 210).

In step 210, conference setup program 200 communicates with session monitoring program 300. In one embodiment, conference setup program 200 communicates information (e.g., user preferences, triggers, conference session command codes, etc.) from user information 104 that is related to one or more sessions that is attended by a user to session monitoring program 300. In another embodiment, conference setup program 200 communicates text transcripts for each session to session monitoring program 300. In some embodiments, conference setup program 200 communicates additional contextual analysis of information within user information 104 to session monitoring program 300. In other embodiments, conference setup program 200 communicates addition content and information generated by additional programs (e.g., cognitive analysis, analytics, contextual analysis, image recognition, etc.) and/or semantic conversion program 106 based on further analysis of the text transcripts for each session to session monitoring program 300.

Referring to decision step 208, responsive to determining that a monitored session ends (Yes branch, decision step 208), conference setup program 200 communicates with a user (step 212).

In step 212, conference setup program 200 communicates with a user. Conference setup program 200 communicates with a user via UI 122. In one embodiment, conference setup program 200 may save a text transcript of a session. In one scenario, conference setup program 200 determines that a system default dictates that a text transcript for a session is saved. In another scenario, conference setup program 200 determines that a user preference within user information 104 overrides the system default. Subsequently, conference setup program 200 provides a user of user device 102 an option to save the text transcript for a session that a user ceases to attend. In another embodiment, conference setup program 200 may advise a user that a session abnormally ended. In an example, user device 102 cannot communicate with client device 115 via network 110 during a session hosted by client device 115. A user may request that conference setup program re-establish a connection (step 204) to the session hosted by client device 115. In some embodiments, conference setup program 200 saves a text transcript of a session to user device 102. In other embodiments, conference setup program 200 saves a text transcript of a session to a database accessible via network 110. In a further embodiment, conference setup program 200 saves a recorded session and a corresponding text transcript generated by semantic conversion program 106.

In decision step 214, conference setup program 200 determines whether to monitor the remaining sessions attended by a user. In one embodiment, conference setup program 200 obtains an indication from a user, via UI 122, to monitor session that are active and that the user attends. In another embodiment, conference setup program 200 determines that a user preference within user information 104 indicates that a user monitors attended sessions.

In decision step 214, responsive to determining to monitor the one or more remaining session (Yes branch, decision step 214), conference setup program 200 communicates with session monitoring program 300 (step 210).

Referring to decision step 214, responsive to determining not to monitor the remaining attended sessions (No branch, decision step 214), conference setup program 200 terminates. If conference setup program 200 determines that no attended sessions exist (No branch, decision step 214), then conference setup program 200 terminates.

Figure 3:
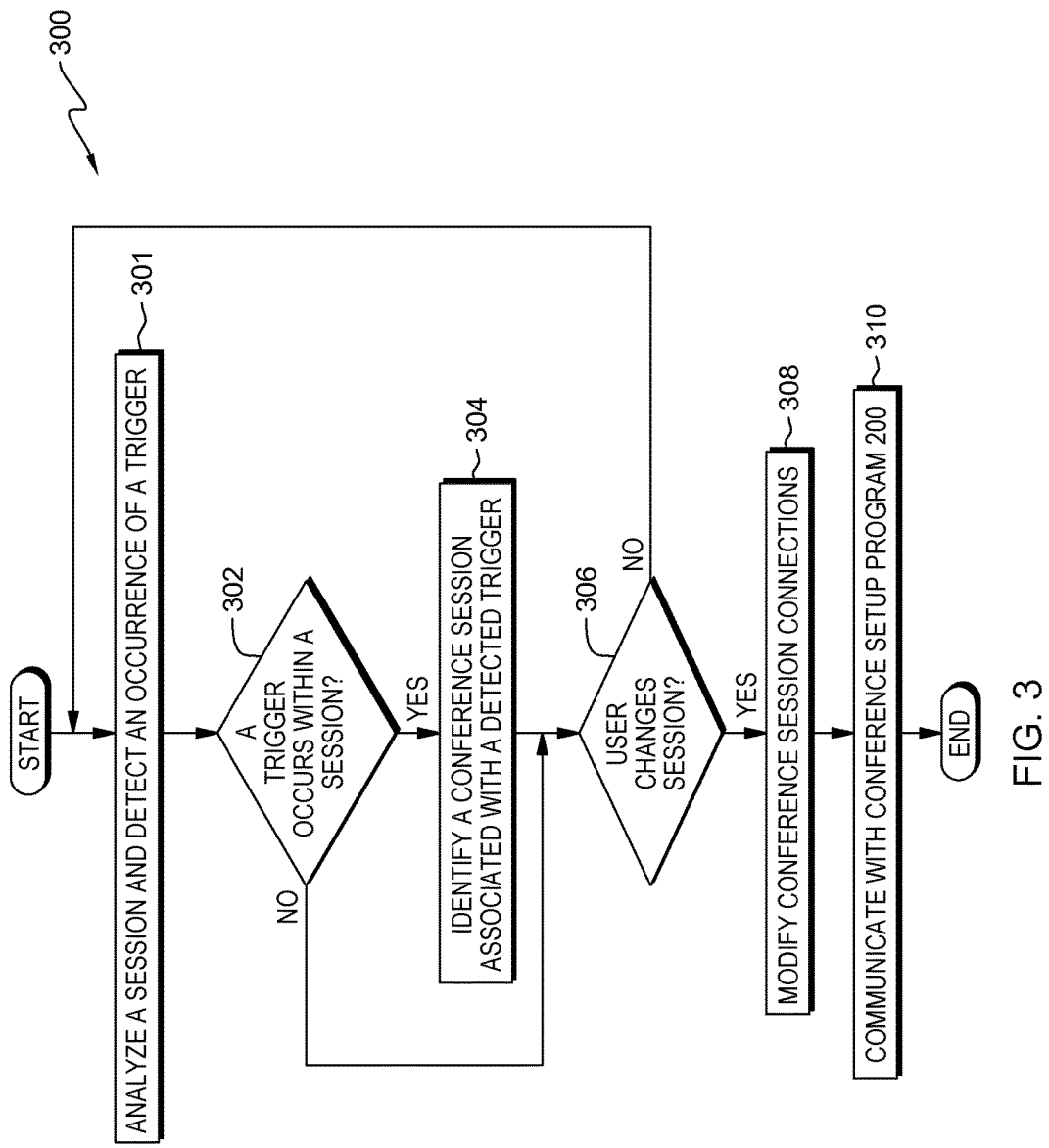
FIG. 3 depicts a flowchart of the operational steps of a session monitoring program, in accordance with an embodiment of the present invention.

FIG. 3 is a flowchart depicting operational steps for session monitoring program 300, a program for monitoring multiple sessions and signaling a user when one or more triggers occur within one of the one or more sessions that a user attends. Session monitoring program 300 may utilize inputs from multiple instances of semantic conversion program 106 and/or conference setup program 200.

In step 301, session monitoring program 300 analyzes a session and detects an occurrence of a trigger. In one embodiment, session monitoring program 300 analyzes a text transcript generated by semantic conversion program 106 corresponding to a session and detects the occurrence of one or more triggers identified within user information 104. In one scenario, session monitoring program 300 may detect a trigger based on general user information (e.g., user name, an employer of the user, etc.) or other generalized triggers defined by a user. In another scenario, session monitoring program 300 detects the occurrence of one or more triggers defined by a user for a session.

In some embodiments, session monitoring program 300 further analyzes a text transcript, generated by semantic conversion program 106, for a session. In one example, session monitoring program 300 may utilize a dictionary function to identify text that is similar (e.g., synonyms, homonyms, common misspellings, etc.) to the text of a trigger. In another example, session monitoring program 300 analyzes elements identified (e.g., highlighted, hyperlinked, etc.) within a session transcript to detect the occurrence of a trigger. In a further embodiment, session monitoring program 300 may utilize: cognitive analysis, contextual analysis, analytics, image processing, voice recognition software, etc., to determine information that relates to a trigger. In an example, session monitoring program 300 may determine the names of coworkers of a user, and detect the names of the coworkers as triggers when a trigger is the name of the user. In another example, session monitoring program 300 determines triggers (e.g., project name, individuals assigned to proposal, etc.) for a session that is associated with a business proposal based on a user trigger of "client name" for a session. In addition, session monitoring program 300 may utilize fuzzy logic and confidence intervals identified within user information 104 when analyzing a session for an occurrence of a trigger.

Referring to step 301, in an alternate embodiment, session monitoring program 300 utilizes instances of various cognitive analysis, contextual analysis, analytics, image processing, and voice recognition software to further analyze: gestures, comments, graphics, sounds, video, etc. of a session to determine related information (e.g., citations, regulations, definitions, news articles, etc.) within the presentation (e.g., proceedings), as opposed to a text transcript provided by semantic conversion program 106. Subsequently, session monitoring program 300 may utilize the related information to detect the occurrence of a trigger. In addition, session monitoring program 300 may utilize fuzzy logic and confidence intervals identified within user information 104 when analyzing a session for related information. In some embodiments, session monitoring program 300 utilizes the analysis of the text transcript generated by semantic conversion program 106 and analysis of a presentation of a session to detect the occurrence of a trigger.

In decision step 302, session monitoring program 300 determines whether a trigger occurs within a session. In response to determining that a trigger occurs within a session (Yes branch, decision step 302), session monitoring program 300 identifies the session that is associated with an occurrence of a trigger (step 304).

In step 304, session monitoring program 300 identifies a conference session that is associated with an occurrence trigger. In one embodiment, session monitoring program 300 applies a visual indication to a window of a session that includes an occurrence of a trigger. In one scenario, session monitoring program 300 highlights a window within UI 122 that includes a session where one or more triggers occurred. In another scenario, session monitoring program may change the size of the window that includes a session where one or more triggers occurred. In a further embodiment, session monitoring program 300 adjusts a visual indication of a window that includes a session that includes an occurrence of a trigger based on the number of unique triggers that occur, the frequency of the triggers that occur, and/or the analysis (e.g., cognitive, contextual, analytics, confidence level) associated with the one or more triggers that occur within a session. In an example, session monitoring program 300 may respond to a single instance of a trigger by applying a constant highlight to a window for a session as opposed to modifying the strobe rate of the highlight of window base on the number of triggers that occur within a session.

In an alternate embodiment, session monitoring program 300 determines that user device 102 (e.g., a smartphone) has a constrained display area. Session monitoring program 300 may determine that a user participates in a session utilizes the full screen area of user device 102. In one scenario, session monitoring program 300 includes an indication within UI 122 as to which session includes an occurrence of a trigger. In another scenario, session monitoring program 300 utilizes another component of user device 102 to advise a user that a trigger occurred within another session. For example, session monitoring program 300 may initiate a haptic event (e.g., the smartphone vibrates) to signal the user that a trigger occurred within another session.

Referring to decision step 302, responsive to determining that a trigger did not occur within a session (No branch, decision step 302), session monitoring program 300 determines whether a user changes to another session (decision step 306).

In decision step 306, session monitoring program 300 determines whether a user changes sessions. In one embodiment, session monitoring program 300 determines that a user changes sessions when the focus of the user changes. In one scenario, session monitoring program 300 determines that a user minimizes a window that includes a session that the user is a participant and enlarges a window associated with another session. In another scenario, session monitoring program determines that a user changes sessions when the user utilizes UI 122 to manually interface with a session (e.g., activate listen-only mode, raise a hand, change the status of a user, etc.). In another embodiment, session monitoring program 300 determines that a user changes sessions based on a response to an event. In one scenario, session monitoring program 300 determines that one or more triggers occur within a text transcript for a session. In another scenario, session monitoring program 300 determines that one or more triggers occurred within the analysis of a presentation within a session. In some embodiments, session monitoring program 300 may determine that a user attends more than one session. In other embodiments, session monitoring program 300 determines that a user changes session when the user selects the window associated with a session.

In decision step 306, responsive to determining that a user does not change sessions (No branch, decision step 306), session monitoring program 300 loops while continuing to detect the occurrence of a trigger within other sessions (step 301).

Referring to decision step 306, responsive to determining that a user changes to another session (Yes branch, decision step 306), session monitoring program 300 modifies session connections (step 308).

In step 308, session monitoring program 300 modifies conference session connections. In one embodiment, session monitoring program 300 determines that a user changes focus (e.g., participate, observe, monitor) between sessions. In one scenario, session monitoring program 300 utilizes user information 104 to obtain command codes for the respective sessions and session monitoring program 300 executes the command codes for a session via a conferencing system (e.g., conferencing software, telephony system, etc.). In another scenario, session monitoring program 300 utilizes UI 122 to obtain input (e.g., select conferencing option) from a user prior to selecting and executing a command code for a session via a conferencing system. In another embodiment, session monitoring program 300 determines that a user modifies the access, status, and/or mode of one or more sessions. In one example, session monitoring program 300 determines that a user ends (e.g., leaves, closes, logs out, etc.) a session. In another example, session monitoring program 300 determines that a user initiates a three-way link between user device 102 and a session hosted by client device 120 and another session hosted by client device 125.

In step 310, session monitoring program 300 communicates with conference setup program 200. In one embodiment, session monitoring program 300 communicates the status of two or more sessions when session monitoring program 300 determines that the focus of the user changes. In another embodiment, session monitoring program 300 communicates that a user ends a session. In some embodiments, session monitoring program 300 communicates information related to: detected triggers (e.g., frequency of occurrence, primary triggers, secondary triggers, fuzzy triggers), the timing of trigger occurrences within a session, and session statistics (e.g., duration, attendees).

Figure 4:
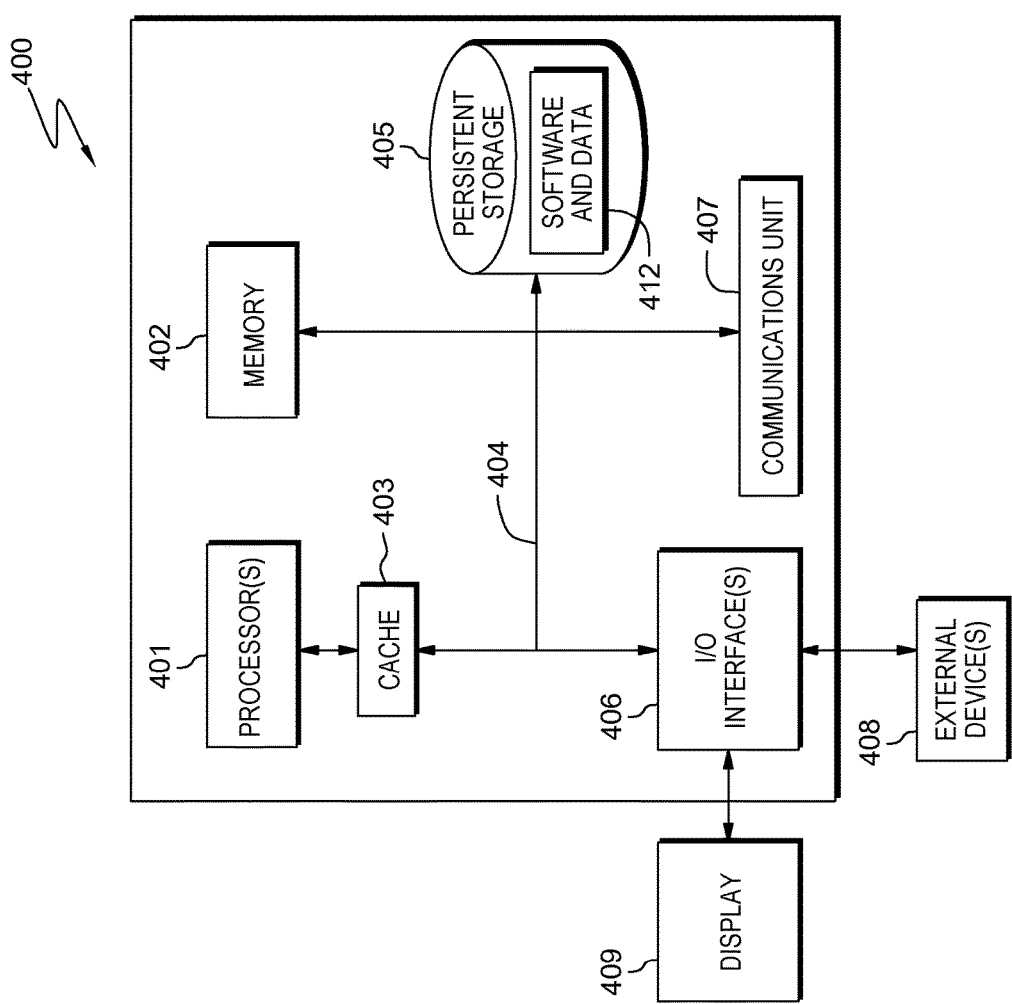
FIG. 4 is a block diagram of components of a computer, in accordance with an embodiment of the present invention.

FIG. 4 depicts computer system 400, which is representative of user device 102, client device 115, client device 120, and client device 125. Computer system 400 is an example of a system that includes software and data 412. Computer system 400 includes processor(s) 401, memory 402, cache 403, persistent storage 405, communications unit 407, input/output (I/O) interface(s) 406, and communications fabric 404. Communications fabric 404 provides communications between memory 402, cache 403, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 are stored in persistent storage 405 for access and/or execution by one or more of the respective processor(s) 401 via cache 403 and one or more memories of memory 402. With respect to user device 102, software and data 412 includes user information 104, semantic conversion program 106, user interface (UI) 122, conference setup program 200, session monitoring program 300, and various programs (not shown). With respect to client device 115, client device 120, and client device 125 software and data 412 includes various (programs not show).

Communications unit 407, in these examples, provides for communications with other data processing systems or devices, including resources of user device 102, client device 115, client device 120, and client device 125. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Software and data 412 used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor. Display 409 can also function as a touch screen, such as the display of a tablet computer or a smartphone.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing multiple electronic conference sessions, the method comprising:
    identifying, by one or more computer processors, a plurality of conference sessions that a user is attending utilizing a computing device, wherein the plurality of conference sessions includes a first session and a second session;
    identifying, by one or more computer processors, one or more predefined triggers of the user, respectively associated with the conferences sessions that the user is attending;
    generating, by one or more computer processors, through a real-time analysis of a presentation corresponding to a conference session that the user is attending, a streaming text transcript based on content spoken during the conference session and at least one element of interpreted content that occurs during the conference session;

determining, by one or more computer processors, that an interface corresponding to the conference session includes a first graphical control element associated with presenting the conference session and a second graphical control element associated with a streaming text transcript corresponding to the conference session; and detecting, by one or more computer processors, an occurrence of at least one trigger of the one or more predefined identified triggers, within the generated streaming text transcript corresponding to the second session of the plurality of conference sessions that the user is attending.

2. The method of claim 1, wherein: (i) at a least a portion of the first session and the second session occur during the same time, (ii) the second session is a conference session different from the first session, (iii) and the user is attending the second session as an observer.

3. The method of claim 1, further comprising:
displaying, by one or more computer processors, a first graphical control element corresponding to the first session and a second graphical control element corresponding the second session; and displaying, by one or more computer processors, at least a portion of the streaming text transcript corresponding to the second session within a respective proximity of the first graphical control element corresponding to the second session.

4. The method of claim 1, wherein detecting the at least one trigger of the identified one or more predefined triggers, within the second session of the plurality of conference sessions that the user is attending, further comprises:
in response to detecting the at least one trigger of the one or more obtained triggers within the streaming text transcript corresponding to the second session, applying, by one or more computer processors, a visual indication to the second graphical control element associated with the second conference session and a portion of the streaming text transcript corresponding to the second conference session that includes the detected at least one trigger.

5. The method of claim 1, wherein generating the streaming text transcript based on content spoken during the conference session and at least one element of interpreted content that occurs during the conference session further comprises:
identifying, by one or more computer processors, a visual element through real-time analysis of the presentation corresponding to the conference session that the user is attending;

in response to identifying the visual element, determining, by one or more computer processors, through one or more real-time analyses, a text description related to the identified visual element corresponding to the conference session; and embedding, by one or more computer processors, the determined text description related to the identified visual element within the generated streaming text transcript corresponding to the conference session.

6. The method of claim 5, wherein embedding the determined text description related to the identified visual element within the generated streaming text transcript corresponding to the conference session further comprises:

including, by one or more computer processors, within the determined text description related to the identified visual element, a hyperlink to an information resource associated with the identified visual element.

7. The method of claim 1, further comprising:
identifying, by one or more computer processors, one or more visual elements within the presentation corresponding to the conference session that the user is attending through real-time analysis of the presentation;

determining, by one or more computer processors, based on a cognitive analysis, whether a visual element of the identified one or more visual elements corresponding to the conference session relates to one or more predefined triggers respectively associated with the conference session; and in response to determining that the cognitive analysis of the visual element corresponding to the conference session relates to trigger of the one or more predefined triggers respectively associated with the conference session, determining, by one or more computer processors, that a trigger of the one or more predefined triggers respectively associated with the conference session is detected.

8. The method of claim 1, further comprising:
determining, by one or more computer processors, that the user selects the interface corresponding to the second session; and in response to determining that the user selects the interface corresponding to the second session, increasing, by one or more computer processors, a size associated with the first graphical control element that displays a presentation corresponding to the second session to the user; and modifying, by one or more computer processors, a connection of the user to the second session, wherein modifying the connection enables the user to attend the second session as an active participant.

9. The method of claim 8, further comprising:
modifying, by one or more computer processors, a connection of the user to the first session, wherein modifying the connection enables the user to attend the first session as an observer.

10. The method of claim 5, wherein determining a text description related to the identified visual element corresponding to the conference session based on the one or more real-time analyses is selected from the group consisting of a cognitive analysis, image recognition, image processing, gesture recognition, and contextual analysis.

11. The method of claim 7, wherein an automated cognitive analysis utilizes information derived from one or more analyses selected from the group consisting of image recognition, image processing, gesture recognition, and contextual analysis.

12. The method of claim 4, further comprising:
modifying, by one or more computer processors, the visual indication applied to the second graphical control element associated with the second conference session is modified based on a number of unique triggers that are detected.

13. The method of claim 4, further comprising:
modifying, by one or more computer processors, the visual indication applied to the second graphical control element associated with the second conference session is modified based on the frequency of occurrence of a detected trigger.

14. The method of claim 4, further comprising:
modifying, by one or more computer processors, the visual indication applied to the second graphical control element associated with the second conference session is modified based on an analysis of a detected trigger.

\* \* \* \* \*